(12) United States Patent
Baietto et al.

(10) Patent No.: US 8,996,065 B2
(45) Date of Patent: Mar. 31, 2015

(54) METHOD FOR AUTOMATICALLY TRANSFERRING AN APPLICATION IN A MOBILE COMMUNICATION TERMINAL OF TELECOMMUNICATION NETWORKS

(75) Inventors: Francesco Baietto, Turin (IT); Sergio Collesei, Buttigliera Alta (IT)

(73) Assignee: Telecom Italia S.p.A., Milan (IT)

( * ) Notice: Subject to any disclaimer, the term of this patent is extended or adjusted under 35 U.S.C. 154(b) by 680 days.

(21) Appl. No.: 13/141,966

(22) PCT Filed: Dec. 24, 2008

(86) PCT No.: PCT/EP2008/011110
§ 371 (c)(1),
(2), (4) Date: Jun. 23, 2011

(87) PCT Pub. No.: WO2010/072243
PCT Pub. Date: Jul. 1, 2010

(65) Prior Publication Data
US 2011/0263296 A1 Oct. 27, 2011

(51) Int. Cl.
*G06K 5/00* (2006.01)
*G06K 19/06* (2006.01)
*G06F 9/445* (2006.01)
*H04L 29/08* (2006.01)

(52) U.S. Cl.
CPC . *G06F 8/60* (2013.01); *H04L 67/34* (2013.01)
USPC ............................ 455/558; 235/380; 235/492

(58) Field of Classification Search
USPC .................................. 455/558; 235/380, 492
See application file for complete search history.

(56) References Cited

U.S. PATENT DOCUMENTS

| 2004/0250247 A1* | 12/2004 | Deeths et al. ................. 717/175 |
| 2005/0141438 A1 | 6/2005 | Quetglas et al. |
| 2005/0184165 A1* | 8/2005 | de Jong ......................... 235/492 |
| 2008/0070627 A1* | 3/2008 | Pua ............................... 455/558 |

FOREIGN PATENT DOCUMENTS

| GB | 2 431 072 A | 4/2007 |
| WO | WO 2008/035183 A2 | 3/2008 |

OTHER PUBLICATIONS

International Search Report from the European Patent Office for International Application No. PCT/EP2008/011110, mailing date Nov. 16, 2009.
CardWerk Smarter Card Solutions, "ISO 7816-3 Smart Card Standard: Part 3: Electronic Signals and Transmission Protocols", pp. 1-15, (2008).

* cited by examiner

*Primary Examiner* — Rafael Pérez-Gutiérrez
*Assistant Examiner* — Joshua Schwartz
(74) *Attorney, Agent, or Firm* — Oblon, McClelland, Maier & Neustadt, L.L.P.

(57) ABSTRACT

A method for transferring an application in a telecommunication terminal includes: storing in a removable smart card identification data related to the application; connecting the removable smart card to the telecommunication terminal in order to establish an electrical communication between them; acquiring by the telecommunication terminal the identification data; sending by the telecommunication terminal the identification data to an application storing device for requesting the application; and downloading in the telecommunication terminal and from the storing device the application corresponding to the identification data.

23 Claims, 11 Drawing Sheets

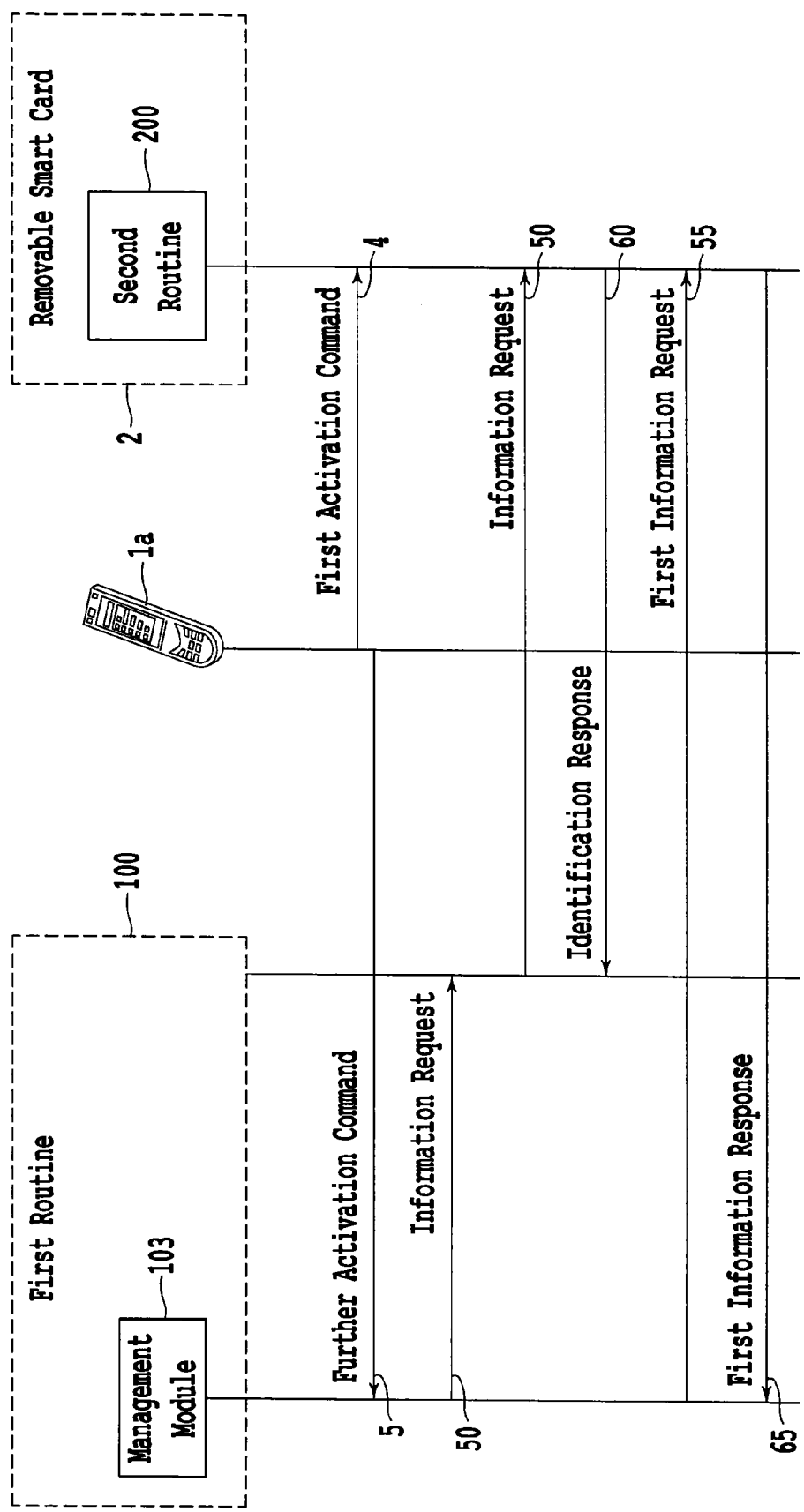

US 8,996,065 B2

METHOD FOR AUTOMATICALLY TRANSFERRING AN APPLICATION IN A MOBILE COMMUNICATION TERMINAL OF TELECOMMUNICATION NETWORKS

CROSS-REFERENCE TO RELATED APPLICATION

This application is a national phase application based on PCT/EP2008/011110, filed Dec. 24, 2008.

TECHNICAL FIELD OF THE INVENTION

The present invention relates to the field of telecommunications, particularly, of the wireless type. In more detail, the present invention relates to a method for the automatic transfer of an application or service in a mobile terminal of wireless networks.

BACKGROUND OF THE INVENTION

At present time, mobile telecom service providers have to control their networks in order to provide their subscribers with relevant and useful services. Such telecom providers usually face a wide range of mobile terminals their subscribers use in their networks. Therefore, a subscriber identification card known as SIM (Subscriber Identity Module) card is associated to each subscriber, to be inserted in the subscriber mobile terminal.

The SIM card allows telecom service providers to control the way subscribers access their networks and services. In fact, through the SIM card, telecom providers guarantee to their subscribers: access to the network and services whatever the mobile terminal, authentication mechanism that allows a strong security access to the network, selection of networks when roaming, portability of information (phone-book). At the same time, subscribers may change to a new mobile terminal only by removing the SIM card from one mobile terminal to another and still access the above services they were already subscribed to.

However, more recent mobile terminals are increasingly becoming multimedia terminals suitable to manage games, videos, photos, sounds, multimedia applications, e-mails, links to internet browsers, telephone numbers other than simple phone calls. Particularly, each subscriber is able to configure his mobile terminal by downloading different multimedia applications, internet browsers links or other services offered.

In order to store such multimedia applications a great storage medium is usually required. As the SIM card is not provided with a great internal memory, the multimedia applications, photos, sounds, provider services which configure the mobile terminal of a subscriber are usually stored into the memory of the mobile terminal itself rather than in the SIM card.

Consequently, when a subscriber decides to change his mobile terminal and transfers the SIM card from one mobile terminal to another, the multimedia applications that configured the previous mobile terminal are lost.

Document US 2005/0141438 (GEMPLUS) describes a method and system for automatically establishing a configuration of a communication appliance functioning with a subscriber identification card (SIM) in a communication network. The configuration of the appliance is established via the network, following the detection and communication of an identifier of the appliance over the network by means of the card. The method comprises a prior step according to which a configuration requirement is detected by means of events or the absence of events stored in the SIM card.

SUMMARY OF THE INVENTION

The applicant has noticed that in the cited prior art document the SIM card is merely a storing device suitable to be accessed by the appliance during the configuration procedure. The present invention aims to allow the automatical configuration of a telecommunication terminal by simply transferring in such terminal a SIM card previously associated to another telecommunication terminal in order to recover all the applications that configured such another terminal. Particularly, in a preferred embodiment, the present invention relates to a method for transferring an application in a telecommunication terminal, comprising:

storing in a removable smart card identification data related to the same application;

connecting said removable smart card to the telecommunication terminal in order to establish an electrical communication between them;

acquiring by said telecommunication terminal the identification data;

sending by the telecommunication terminal said identification data to an application storing device for requesting the application;

downloading in the telecommunication terminal and from the storing device the application corresponding to the identification data.

Preferred embodiments of said method are described in the dependent claims.

BRIEF DESCRIPTION OF THE DRAWINGS

To better understand the present invention and appreciate the advantages thereof, a number of non-limiting, exemplary embodiments of the same will be described below, with reference to the annexed figures, in which:

FIGS. 8 and 9 shows schematically further steps of the method indicating operations requested to download a missing application from a server.

DESCRIPTION OF PREFERRED EMBODIMENTS

Figure 1:
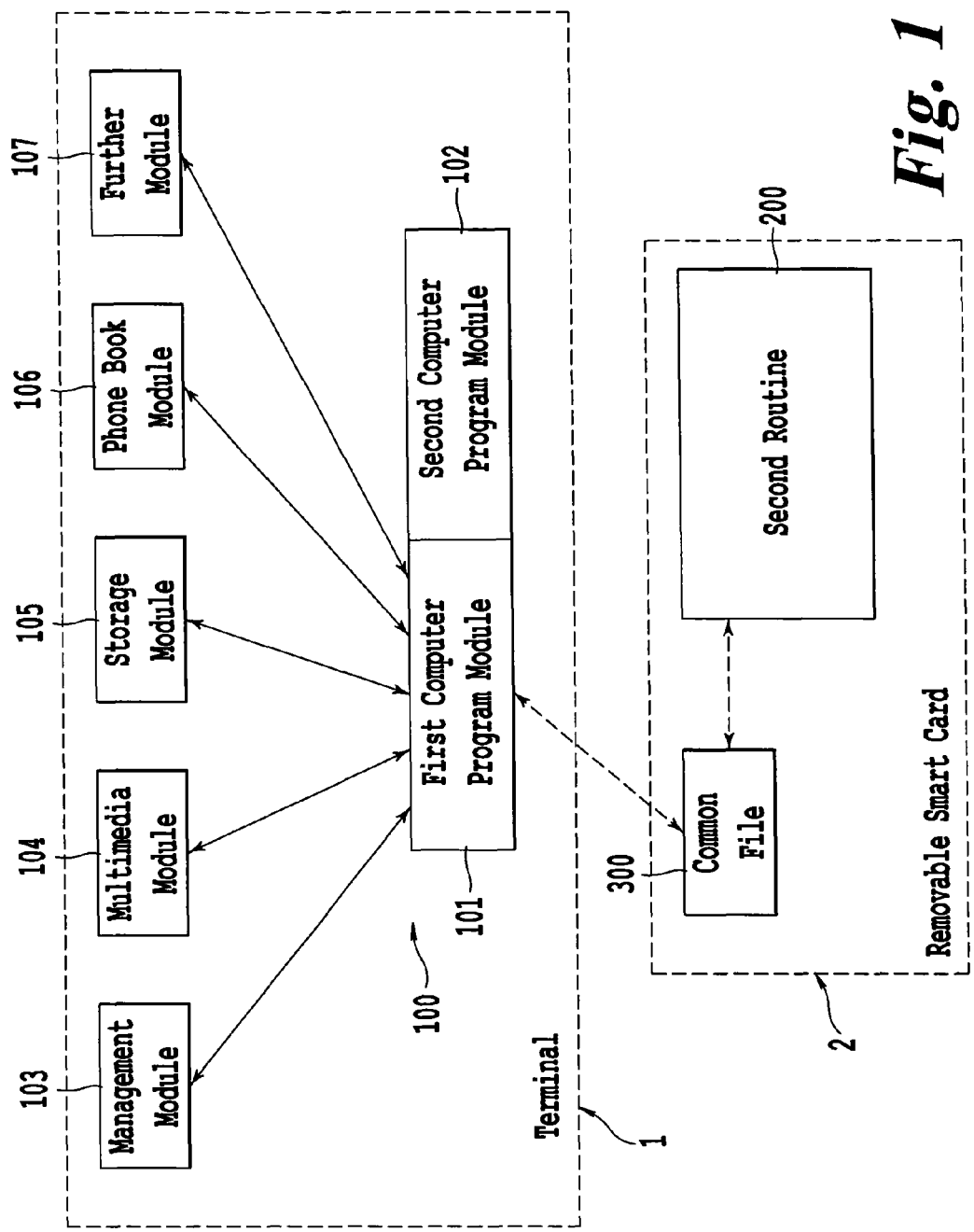
FIG. 1 shows schematically an exemplary embodiment of a telecommunication terminal including a first application routine and a removable smart card including a second application routine.

A method for transferring an application into a telecommunication terminal 1 is described with reference to FIGS. 1-9. Particularly, in the following, the word application will be used to indicate: games, videos, photos, sounds, multimedia applications, links to internet browsers and telephone numbers. In addition to such telecommunication terminal 1, the inventive method also involves a removable smart card 2 and an application storing device 3.

In accordance with a preferred embodiment, such terminal 1 may be a mobile equipment (such as a mobile phone), a Personal Digital Assistant (PDA), a portable computer or other appliance provided with a communication function and interface.

Preferably, the terminal 1 is a GPRS/EDGE/UMTS/HSDPA mobile equipment. As it is known, EDGE (Enhanced Data rates for GSM Evolution) is an evolution of the standard GPRS (General Packet Radio Service) dedicated to the data transfer on a second generation, e.g. GSM (Global System for Mobile Communications), network.

UMTS (Universal Mobile Telecommunications System) is one of the third-generation (3G) mobile phone technologies. Currently, the most common form of UMTS uses W-CDMA (Wideband Code Division Multiple Access) as the underlying air interface and GSM infrastructures. High-Speed Downlink Packet Access (HSDPA, also known as High-Speed Downlink Protocol Access) is a further 3G mobile telephony communications protocol which allows networks based on Universal Mobile Telecommunications System (UMTS) to have higher data transfer speeds and capacity.

In addition, the mobile terminal 1 includes an operating system, for example, Symbian or Windows-Mobile, which allows different applications stored in a suitable memory of the mobile terminal 1 to be run on the same terminal.

In accordance with a further preferred embodiment, the removable smart card 2 is a SIM (Subscriber Identity Module) card or a USIM (Universal Subscriber Identity Module) card, i.e. a removable smart card for mobile phones which is associated to a subscriber of a telecommunication service.

Reference herein to a SIM card is purely by way of exemplary description of an embodiment and is not to be construed in a limiting sense.

As it is known, the SIM card 2 is housed inside the mobile terminal 1 and it securely stores the service-subscriber key used to identify the mobile phone by a service provider. The SIM card 2, usually, comprises a program memory ROM (Read only Memory) comprising in particular an operating system for the card and specific algorithms, a programmable memory and a random access memory (RAM).

Moreover, the SIM card 2 also comprises a microprocessor connected via a data and control bus to the ROM, the programmable memory and the RAM. Such microprocessor is suitable to execute applications stored therein.

As it is known, the SIM card 2 allows users to change phones by simply removing the card from one mobile phone and inserting it into another mobile phone.

Preferably, the SIM card 2 is in accordance with the GSM standard 11.14 which defines a SIM application toolkit (SAT) for the SIM, i.e. an application routine that can be executed by the microprocessor included in the SIM itself. In addition, the same standard 11.14 defines a Protocol Data Unit for Applications (APDU) for the SIM—mobile terminal interface. Particularly such APDU comprises a plurality of commands that the SIM card 2 can exchange with the mobile terminal 1.

The application storing device 3 comprises a server, i.e. a computer usually located remotely with respect the mobile terminal 1. Particularly, the server 3 includes a microprocessor, a mass storage memory (hard disk), a volatile memory (RAM) and telecommunication means in order to establish a wireless communication with the mobile terminal 1. The server 3 stores, in its mass storage memory, the above indicated applications to be transferred to the mobile terminal 1 when requested.

In a preferred embodiment, the mobile terminal 1 and the SIM card 2 can store a first 100 and a second 200 application routine, respectively in their own memories.

FIG. 1 shows schematically in a block scheme both a preferred embodiment of the first application routine 100 stored in the mobile terminal 1 and the second application routine 200 comprised in the SIM card 2. Particularly, such first 100 and second 200 routines can exchange information between them by accessing to a common file 300 comprised in the SIM card 2 as will be described in detail in the following. Particularly, such file 300 comprises a multiplicity of records each devoted to store a short message SMS (Short Message Service) into the memory of the SIM card 2. For example, such file 300 comprises 30 records.

With reference to FIG. 1, the first routine 100 comprises a first block 101, i.e. a first computer program module acting as a communication interface or Communication Framework between a plurality of service computer program modules 103-107 included in the same first routine 100 and the second routine 200 of the SIM card 2. Particularly, such first computer program module 101 is suitable to manage requests for accessing to the second routine 200 generated by the plurality of service modules 103-107. In addition, the first module 101 performs segmentation-and-reassembly operations on commands sent to the SIM card 2.

The first routine 100 also includes a second computer program module 102 acting as a process manager or Background Process Manager to perform in background a multiplicity of operations. In this way, a user of the mobile terminal 1 is not aware of the operations performed. For example, when the mobile terminal 1 is powered on, such second module 102 is suitable to automatically activate the first module 101 (with no intervention of the user) in order to communicate to the SIM card 2 that the mobile terminal 1 comprises the first routine 100.

It should be observed that each service module 103-107 performs a different operation within the first routine 100 and the number of such service modules can be increased by adding new functionalities.

For example, the first routine 100 comprises a management module 103 (or Application Management) acting to monitor the applications installed in the mobile terminal 1 and to compare them with a list of applications stored in the corresponding SIM card 2. In this way, if one or more applications listed in the SIM card 2 are not included in the mobile terminal 1, the management module 103 performs a request to the server 3 in order to download them. Vice-versa, if module 103 verifies that an application stored in the mobile terminal 1 is not listed in the SIM card 2, such list of applications is upgraded by a reference to the missing application.

The first routine 100 also includes a multimedia module 104 (Interactim MM) to realize new services on the mobile terminal 1 by replicating the SAT services performed in the SIM card 2. Such new services are, for example, encoding/decoding reserved data, memorizing such data in protected memory locations, etc.

A further service module includes a storage module 105 (SMS Storage Back Up) acting to transfer all the SMSs (Short Message Service) received by the mobile terminal 1 into the corresponding SIM card 2 of the user. Particularly, the storage module 105 operates in background to compress each SMS received on the mobile terminal 1 to subsequently send it to the second routine 200, i.e. to the SIM card 2. In this way, such SMSs can not be lost when the SIM card 2 is transferred inside another mobile terminal.

It should be observed that when the memory of the SIM card 2 is full, i.e. no more new SMSs can be stored therein, each new SMSs received by the mobile terminal 1 can be sent to a further external server 3'. Such further server 3' usually differs from the server 3, but in some cases such servers can coincide. In a preferred embodiment, the memory of the SIM card 2 is periodically empty by transferring the SMSs stored therein into the further server 3'. In this way, for each SIM card 2 a SMSs database is created in such server 3'.

Moreover, the first routine 100 also comprises a phone book module 106 (Phone Book Syncronization) operating in the same way as the storage module 105 for saving telephone contacts memorized in the mobile terminal 1 into a corresponding phone book of the SIM card 2. In more detail, the word contact is used to indicate not only a telephone number, but also an e-mail address, a home or business address, images, etc.

Furthermore, the first routine 100 can also include a further module 107 (Proxy Smart Card Web Server or SCWS) acting to communicate to a web server comprised in the SIM card 2. Such module 107 allows a plurality of functionalities, for example, it can operate to send a SMS generated by a link to a web site.

Figure 2:
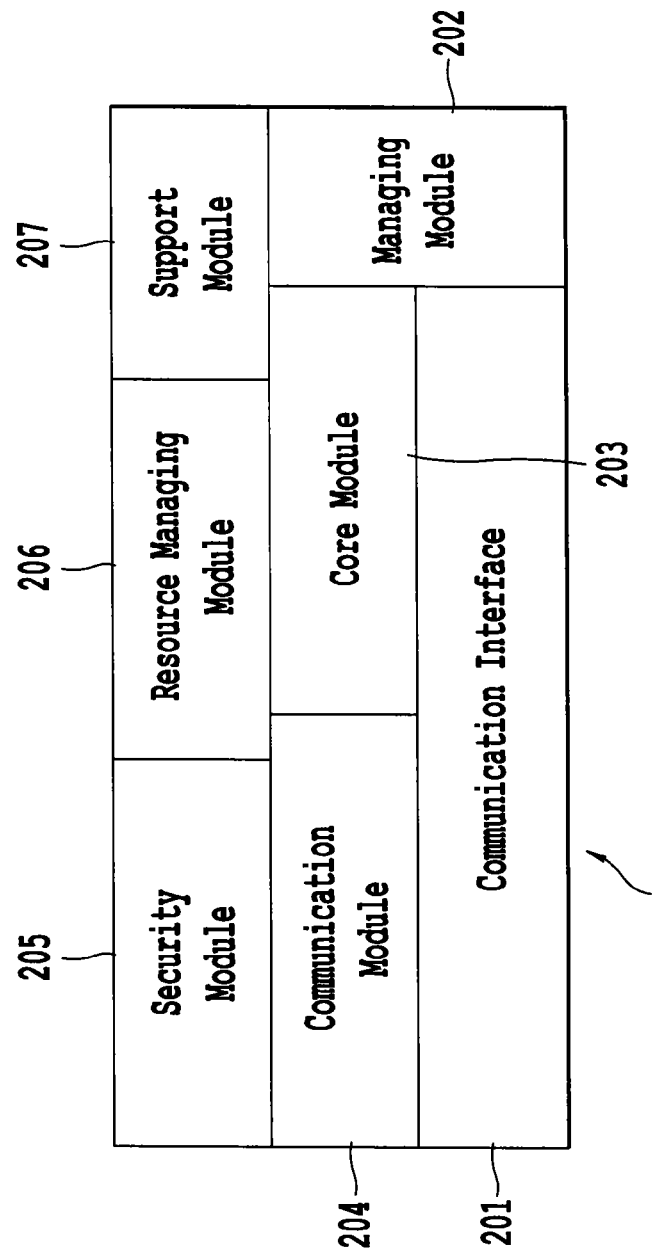
FIG. 2 shows schematically an exemplary embodiment of the second application routine included in the removable smart card.

A preferred embodiment of the second application routine 200 stored in the SIM card 2 can be described with reference to FIG. 2.

Particularly, such second routine 200 includes a further first computer program module 201 acting as a communication interface (Communication Framework) with the corresponding first module 101 of the first routine 100. Such further first module 201 comprises sub-modules (not shown in FIG. 2) for performing both segmentation-and-reassembly operations on the messages exchanged with the mobile terminal 1 and a transaction message functionality.

Transaction message functionality keeps track of the session messages, that can come from more modules (with reference to FIG. 1, messages may come to elements 103-107). In particular, it keeps track of who sent the message which began a dialogue that is identified as session.

In addition, the second routine 200 comprises an APDU managing module 202 (Event/APDU Manager) which is suitable to alert a corresponding core module 203 when one APDU sent by the mobile terminal 1 has been received. Particularly, such core module 203 or Engine represents a clever portion of the second routine 200 acting to interpret information and messages received and to coordinate actions performed by all other modules of the second routine 200.

Furthermore, the second routine 200 also comprises a resource managing module 206 which is suitable to create files located in the memory of the SIM card 2 wherein the information received by the same card can be stored.

A further communication module 204 of the second routine 200 is suitable to receive SMS-OTA (SMS—over the air) sent by the service provider to the SIM card 2 in order to activate a new service or to update an existing one. Such module 204 also allows to receive configuration and security messages.

A security module 205 interfaces both the core module 203 and the resource managing module 206 to allow them to secure access to a message or information, particularly, when the same are encoded or protected with a digital signature.

The second routine 200 can perform further operations implemented by a support module 207. For example, such module 207 can perform a communication with the SCWS module 107 of the first routine 100 or can include a radio interface integrated in the SIM card 2.

Figure 3:
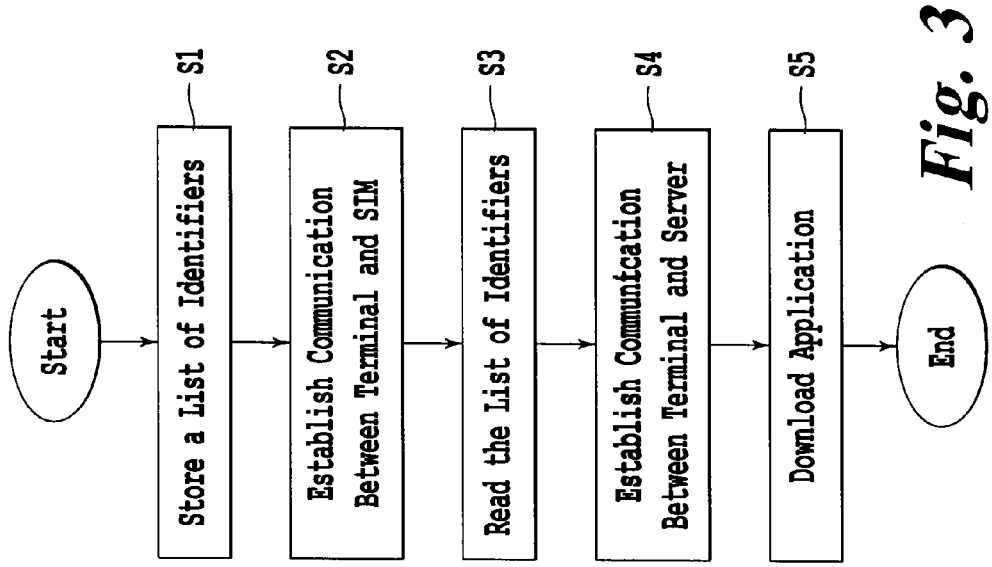
FIG. 3 is a block diagram showing a preferred embodiment of a method for transferring an application into the telecommunication terminal in accordance with the invention.

FIG. 3 shows schematically in a flow-chart a preferred embodiment of the inventive method for transferring an application into the mobile terminal 1, provided with the first application routine 100, by connecting the same terminal 1 to the SIM card 2 comprising the respective second routine 200.

In the following, we suppose that the SIM card 2 was previously connected to a first mobile terminal 1' (not shown in the figures) having a multiplicity of different applications memorized in its own memory. In other words, such applications defined a user configuration for such first terminal 1'.

According to FIG. 3, the SIM card 2 is suitable to store (phase S1) a list of identifiers i.e. identification data, in respective memory locations, each identifier indicating an application that is stored into the first mobile terminal 1'.

Then, the SIM card 2 is separated from the first mobile terminal 1' to be inserted into the mobile terminal 1. Particularly, the method comprises a phase of establishing a communication (phase S2) between the mobile terminal 1 and the SIM card 2 (e.g. by electrically connecting them).

Therefore, the inventive method provides a phase of acquisition, by reading (phase S3) the above indicated list of identifiers by the mobile terminal 1 and comparing such list with a further list indicating applications currently stored in the mobile terminal 1 itself.

If at least one identifier included in the list is missing in the further list, i.e. the corresponding application is not comprised in the mobile terminal 1, a communication between the same mobile terminal 1 and the server 3 is established (phase S4), and the identification data (i.e. the identifiers) are sent by the telecommunication terminal 1 to the application storing device (server 3).

In this way, the application corresponding to the missed identifier can be downloaded (S5) in the mobile terminal 1 from the same server 3.

In a preferred embodiment, the above phase of establishing a communication S2 between the mobile terminal 1 and the SIM card 2 comprises an initialization phase preferably performed at the start up of the mobile terminal 1 itself. Advantageously, such initialization phase allows the first application routine 100 of the mobile terminal 1 to verify that the corresponding second application routine 200 is comprised in the SIM card 2 and vice-versa.

In a preferred embodiment, the above indicated initialization phase is performed in background, i.e. it is performed automatically when the mobile terminal 1 is started up and it does not involve the user of the mobile terminal itself.

Moreover, such initialization phase can be performed in accordance with three different scenarios described with reference to FIGS. 4, 5 and 6. Identical or similar elements will be referred to by the same numerals throughout the figures.

Figure 4:
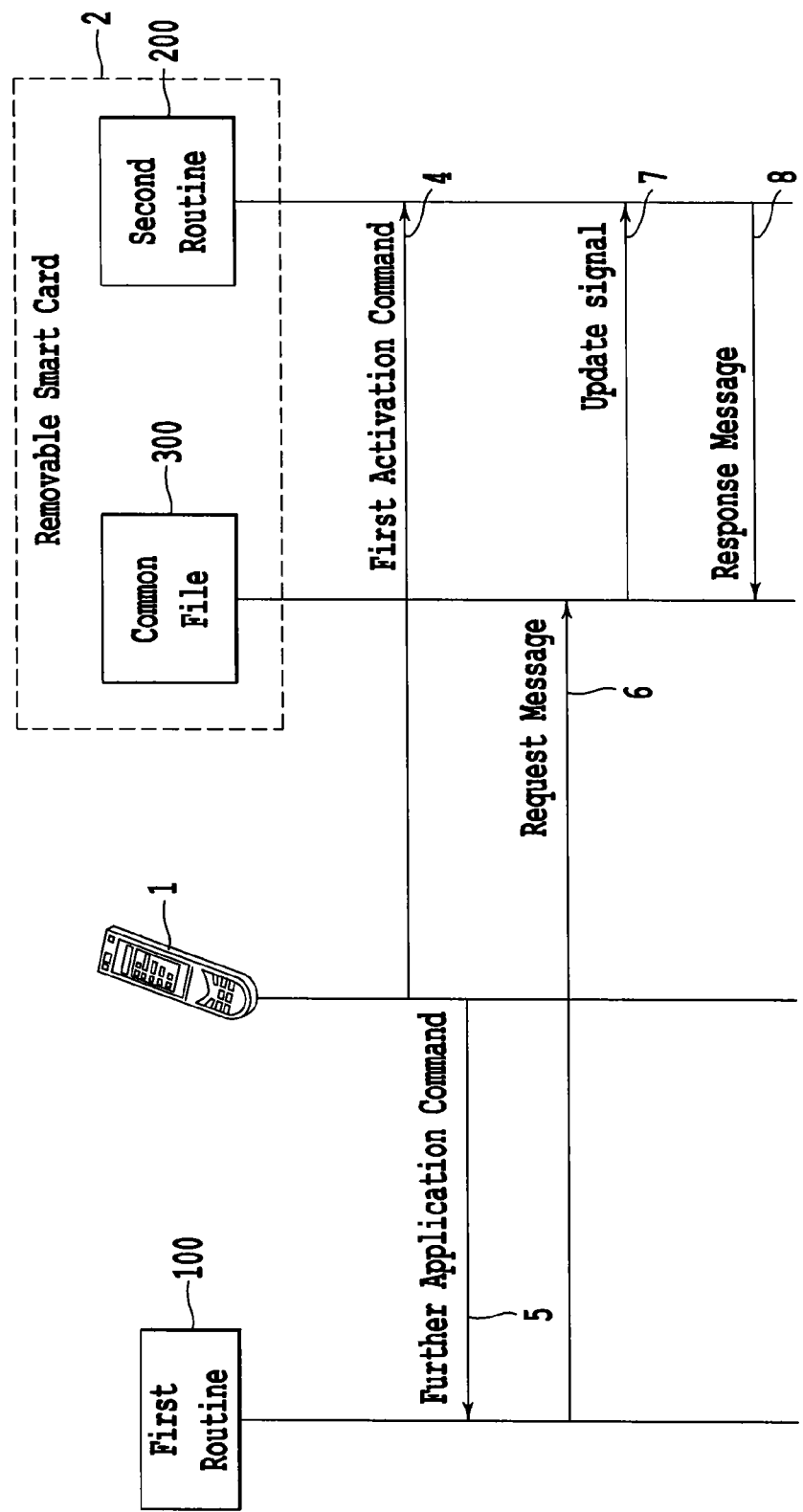
FIGS. 4, 5 and 6 show schematically three different scenarios related to an initialization step of the method of FIG. 3.

According to FIG. 4, in a first scenario, we assume that the first 100 and the second 200 application routines are included in the mobile terminal 1 and in the SIM card 2, respectively.

In this case, when the mobile terminal 1 is switched on, the same terminal 1 activates the SIM card 2, i.e. the second routine 200, by sending a first activation command 4 to it. Such first command 4 is a standard APDU defined "Terminal Profile" by those skilled in the art. At the same time, the mobile terminal 1 activates the first routine 100 by a further activation command 5.

After activation, the first routine 100 accesses the common file 300 included in the SIM card 2 to read one of its records. Preferably, the 30$^{th}$ record of such file 300 (corresponding to the last record) is accessed. Advantageously, if the common file 300 is full, i.e. the 30$^{th}$ record contains a SMS message, such message is stored by the first routine 100 in the memory of the mobile terminal 1. Then, the first routine 100 overwrites the message contained in the 30$^{th}$ record by replacing it with a request message 6 addressed to the SIM card 2 in order to verify if such card 2 includes the corresponding second routine 200.

Moreover, with the $30^{th}$ file record overwritten, an update signal 7 generated by the common file 300 is sent to the second routine 200 to indicate that a new message is present in such $30^{th}$ record.

Therefore, the second routine 200 reads the $30^{th}$ record to verify that the message included therein has been really generated by the first routine 100. In fact, the request message 6 is, usually, a coded message having a respective header indicating the first routine 100 that generated it. In this way, the second routine 200 can verify that the first routine 100 is present in the mobile terminal 1.

In addition, the second routine 200 responds to the request message 6 by creating a response message 8 to be written in the same $30^{th}$ record of the common file 300. Therefore, the first routine 100 is able to read the response message 8 created by periodically accessing to the file 300. In this way, the first routine 100 is, finally, informed that the SIM card 2 is provided with the second routine 200 and a bidirectional communication between them is established.

After that, the inventive method of FIG. 3 can be started.

Figure 5:
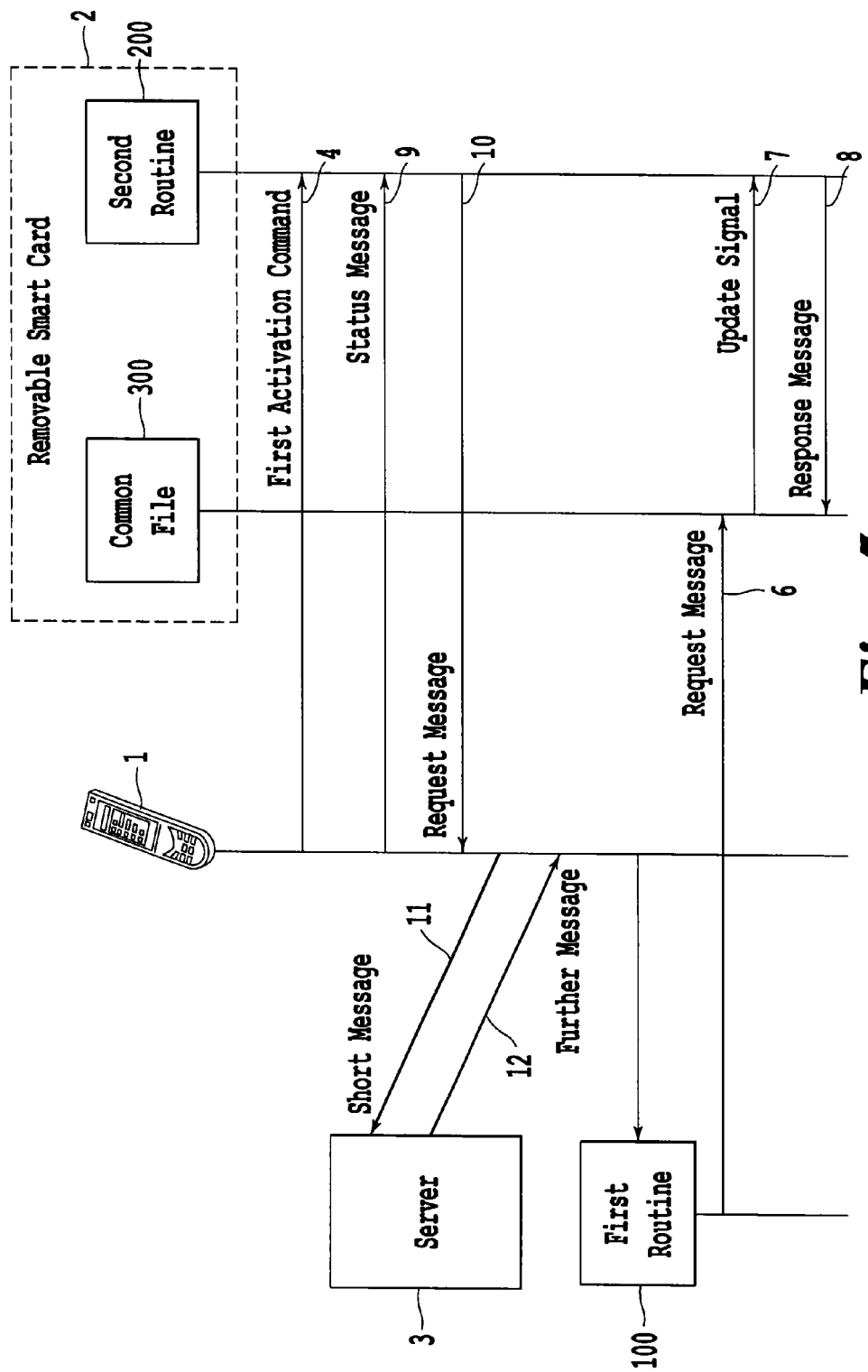

According to FIG. 5, in a second scenario, we assume that the second application routine 200 is included in the SIM card 2, but in the mobile terminal 1 the corresponding first routine 100 is missing.

In this case, after switching on of the mobile terminal 1, the same terminal 1 activates the SIM card 2 by sending the first activation command 4.

Then, the mobile terminal 1 generates and sends also a status message 9 to the second routine 200. Such status message 9 is a first of a plurality of status messages received by the second routine 200. Particularly, each status message 9 is a standard APDU defined "request status" in accordance to a GSM standard 11.11 as known by those skilled in the art. The status message 9 is used to inform the mobile terminal 1 when the SIM card 2 is removed from the same terminal.

Once received the first activation command 4, the second routine 200 starts to count the number of status messages 9 sent by the mobile terminal 1. Preferably, each status message 9 is generated every 30 seconds. Operatively, after that the second routine 200 has received the third status message 9, if, in the meantime, the same routine 200 has not received the corresponding request message 6 as indicated in the previous scenario, it is assumed that the mobile terminal 1 does not comprise the first routine 100. Therefore, the missing first routine 100 has to be downloaded from the server 3 in order to establish the requested bidirectional communication.

To this end, the second routine 200 sends a respective own request message 10 to the mobile terminal 1 in order to know an IMEI (International Mobile Equipment Identity) number which unambiguously identifies such terminal. Once received, such IMEI number is written in a short message (SMS) 11 to be sent by the mobile terminal 1 to the server 3 for requesting the missing first routine 100.

By reading the received IMEI number, the server 3 firstly verify that the mobile terminal 1 is properly provided with an operating system which allows the missing first routine 100 to be installed therein. Advantageously, the server 3 includes a plurality of first routines 100 that can be associated to different operating systems of different mobile terminals.

The server 3 replies to the mobile terminal request by providing to it the first application routine 100. In a preferred embodiment, the server 3 replies to the mobile terminal request by sending a further message 12 which includes a URL (Uniform Resource Locator). Particularly, such URL is a browser link for allowing the user to a rapid download of the first application routine 100 by internet. In a further embodiment, the further message 12 sent by the server 3 comprises a MMS (Multimedia Messaging Service) suitable to store the whole first application routine 100 to be sent to the mobile terminal 1.

In both cases, the first routine 100 received by the mobile terminal 1 is, subsequently, installed in the terminal itself.

According to FIG. 5, further steps of the method correspond to the ones described with reference to FIG. 4.

Particularly, after being installed, the first routine 100 accesses for reading the $30^{th}$ record of the common file 300. Particularly, the request message 6 addressed to the SIM card 2 is written in such record.

Moreover, the update signal 7 generated by the common file 300 is sent to the second routine 200 to indicate that a message is present in the $30^{th}$ record. Therefore, the second routine 200 reads such record to verify the authenticity of the message included therein, i.e. to verify that the first routine 100 is really included in the mobile terminal 1.

Moreover, the second routine 200 responds to the request message 6 by writing the response message 8 in the same $30^{th}$ record of the common file 300. As indicated above, the first routine 100 reads the response message 8 by periodically accessing to the common file 300. In this way, the first routine 100 is informed that the second routine 200 is included in the SIM card 2 and a bidirectional communication between them can be established.

Also in this case, the inventive method can be started.

Figure 6:
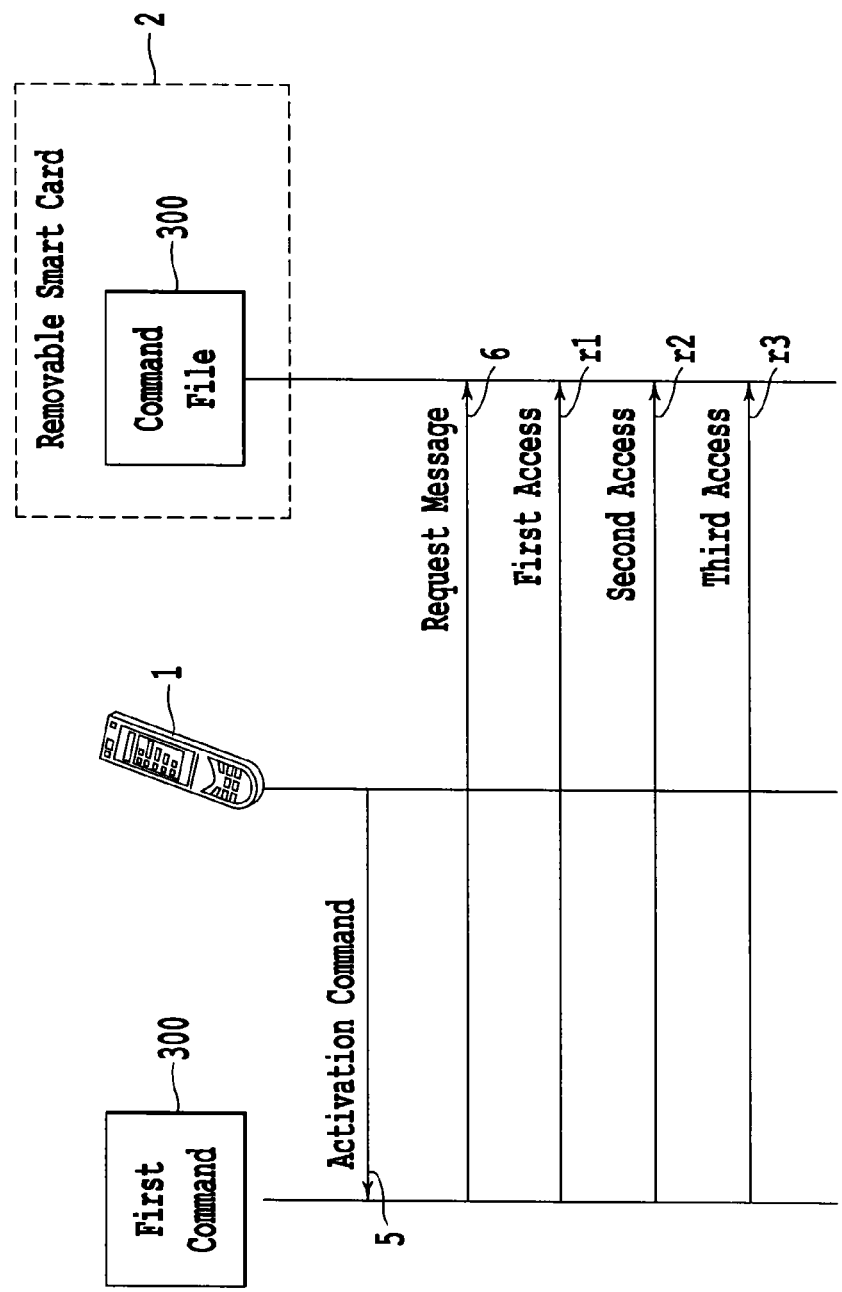

According to FIG. 6, in a third scenario, we assume that the first 100 routine is included in the mobile terminal 1, but the SIM card 2 is deprived of the corresponding second routine 200.

In this case, at the switching on, the mobile terminal 1 activates the first routine 100 by the further activation command 5. Then, the same first routine 100 reads the $30^{th}$ record of the common file 300 and writes therein the request message 6 addressed to the SIM card 2.

After a first time interval $t_1$, the routine 100 reads the $30^{th}$ record of the common file 300 to verify whether the expected answer generated by the second routine 200, i.e. the response message 8, is contained therein. Particularly, the first routine 100 performs a first access r1 to the common file 300. Receiving no answer from the SIM card 2, the first routine 100 reads again the $30^{th}$ record after at least a second $t_2$ and a third $t_3$ time intervals, i.e. the routine 100 performs a second r2 and a third r3 accesses. Whether the response message 8 is still missing after the third $t_3$ time interval, the first routine 100 deducts that the respective second routine 200 is not provided within the SIM card 2.

In this case, the inventive method of FIG. 3 cannot be started, but the first routine 100 can, advantageously, generate an alert message to inform the user. In any case, the first routine 100 can still provide the services connected to the storage module 105 and to the phone book module 106.

Therefore, the inventive method described with reference to FIG. 3 can be performed only whether the second routine 200 is included in the SIM card 2.

In the following, a detailed description of an exemplary preferred embodiment of the method of FIG. 3 will be furnished with reference to FIGS. 7A-7C.

Particularly, it will be assumed that the first 100 and the second 200 routine are comprised in the mobile terminal 1 and in the SIM card 2, respectively. Furthermore, it will be assumed that both the mobile terminal 1 and the SIM card 2 are new appliances, i.e. no further applications are installed therein other than such routines 100 and 200.

In addition, the following exemplary embodiment refers to operations performed by the application management module 103 of the first routine 100 which acts to monitor the applications installed in the mobile terminal 1.

As indicated in the previous FIG. 1, it should be observed that both the management module 103 and each other module 104-107 included in the first routine 100 operate as "client" processes suitable to interact with the second routine 200 through the communication interface module 101 acting as a "server". Particularly, such modules 103-107, each representing a different service offered to the user, address their requests to the interface module 101 in order to exchange data or information with the SIM card 2. Such interface module 101 responds to different incoming requests in order to coordinate the access of each module 103-107 to the second routine 200.

Figure 7A:
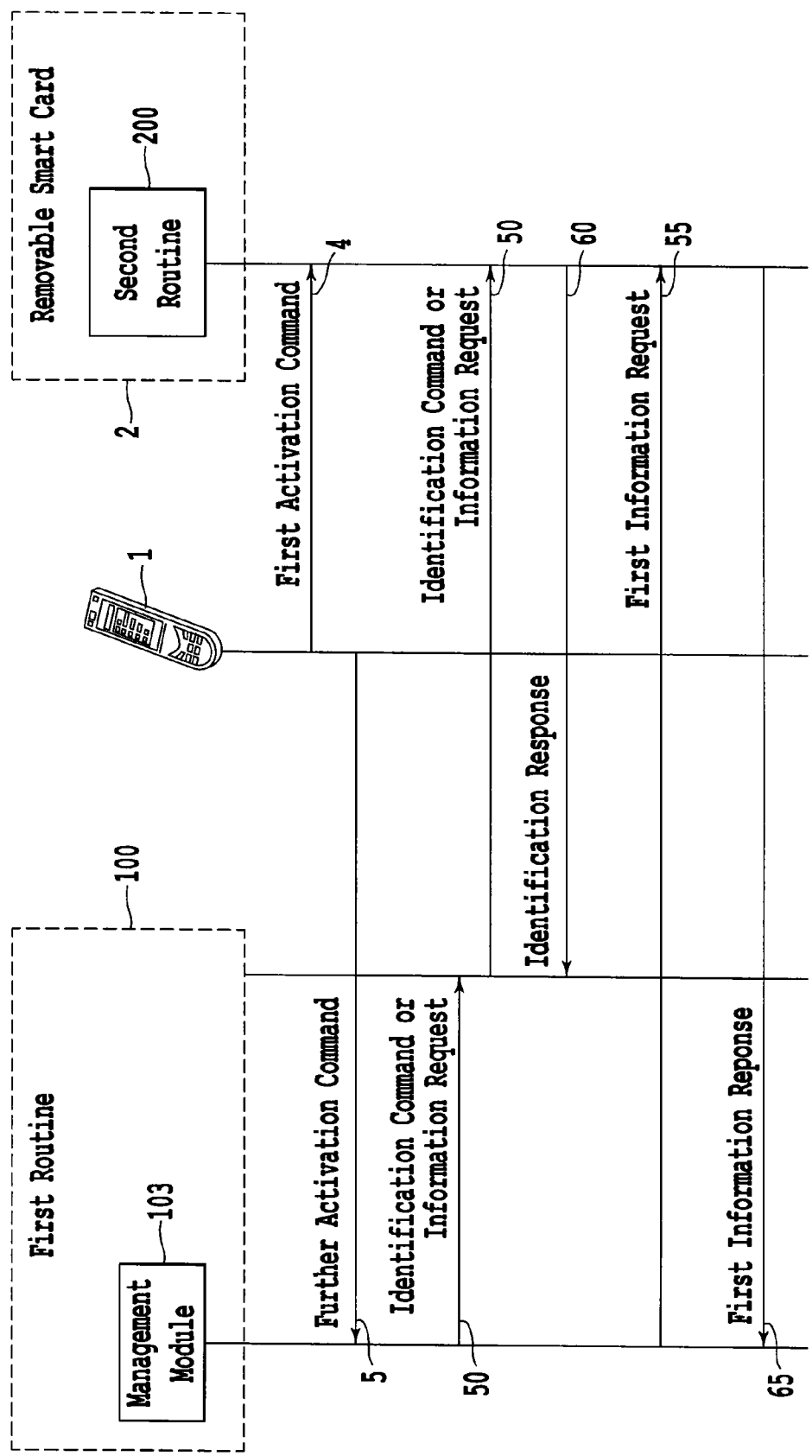
FIG. 7A-7C show schematically an exemplary embodiment of the method related to operations performed by the first application routine to monitor the applications installed in the telecommunication terminal.
Figure 7B:
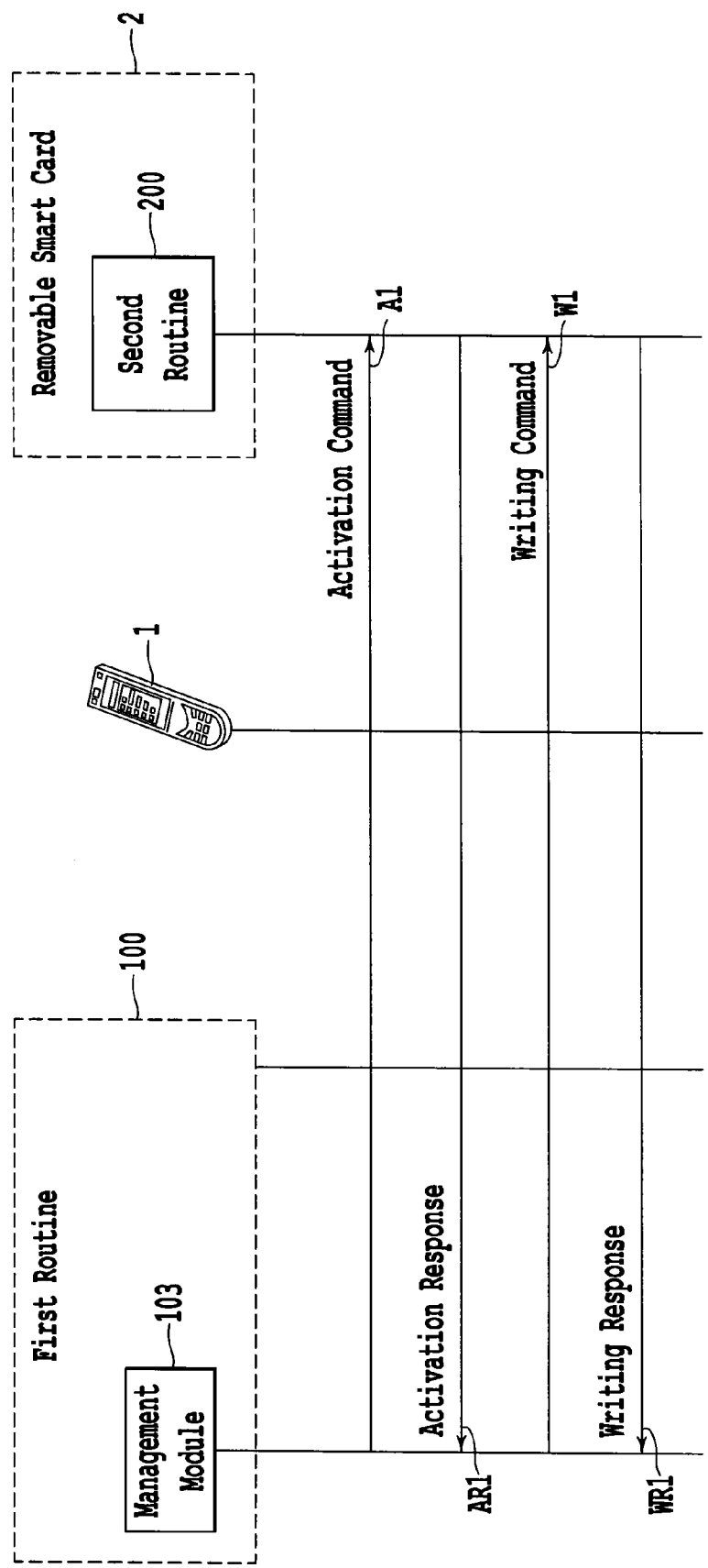

With reference to FIG. 7A, when the mobile terminal 1 is switched on, the same terminal 1 activates the second routine 200, by sending the first activation command or "Terminal Profile" 4 to it. At the same time, the mobile terminal 1 activates the first routine 100 and, particularly, the application management module 103 by the further activation command 5. Subsequently, the same management module 103 sends a respective identification command or information request 50 (Get Version) to the first routine 100, particularly to its interface module 101, in order to know whether the second routine 200 is included in the SIM card 2. By the interface module 101, such first request 50 is sent to the second routine 200 which replies giving a respective identification response 60 to confirm to be present.

For example, as indicated with reference to FIG. 1, such request/response exchanged between the first 100 and the second 200 routine is performed by interposition of the common file 300 in the same way as described above with reference to the initialization phase.

In this way, the application management module 103 is aware of the second routine 200.

Then, the application management module 103 sends a first information request 55 to the second routine 200 in order to know the list of applications installed in the SIM card 2. As the SIM card 2 is new, the second routine 200 reply by a first information response 65 indicating that such list is not present.

Therefore, the application management module 103 creates a first file F1 on the mobile terminal 1 (stored in the memory of the same terminal) for storing identification data related to all applications included SIM card 2. For example, for each application, the first file F1 can store: an identifier of the application, a name indicating the application, a memory location where it is stored, etc.

In addition, the first file F1 also includes a first counter for indicating the number of applications stored therein. In this case, since no applications are installed in the SIM 2, the first file F1 remains empty and first counter=0.

Subsequently, the same management module 103 performs a first scanning of the File System of the mobile terminal 1 searching for applications installed therein.

Then, the management module 103 creates a second file F2, analogous to the first one, memorized in the mobile terminal 1 for storing identification data of the applications included in the mobile terminal itself. Such second file F2 includes a respective second counter for indicating the number of applications stored in the mobile terminal 1. As such mobile terminal 1 is also new, i.e. no applications are installed, this second file F2 remains empty and second counter=0.

Further, the management module 103 compares the first F1 and second F2 files. Both files are empty, therefore no updating of such files F1 and F2 is requested.

Moreover, a third file F3 can be created in the SIM card 2 by the application management module 103 with the aim to include in the same card data related to the list of applications installed in the mobile terminal 1, i.e. to include identification data of said applications. In more detail, in a preferred embodiment described with reference to FIG. 7B, the management module 103 sends an activation command A1 to the second routine 200 in order to create such third file F3. The second routine 200 replies with an activation response AR1 after that the requested third file F3 has been created.

Subsequently, the management module 103 sends a writing command W1 to the second routine 200. Such writing command W1, advantageously, includes the list of applications (i.e. identification data of said applications) installed in the mobile terminal 1, i.e. the content of the second file F2 (in this case no applications are listed). The second routine 200 responds to such writing command W1 by a suitable writing response WR1 to indicate that the list of applications (particularly their identification data) has been correctly received.

After a wait period, for example, twenty minutes, the management module 103 performs a second scanning of the File System of the mobile terminal 1 searching for new applications installed therein. Each new application found during such operation is listed in the second file F2 by including its identification data into the same file F2. If no new applications have been installed, the content of second file F2 remains unchanged. Therefore, by comparing the first F1 and second F2 file, no further operations are requested as the two files coincide.

After a further wait period, the application management module 103 performs a further scanning of the File System in the mobile terminal 1 repeating the same operations above indicated. It should be observed that such operations are evenly repeated in background without any intervention of the user until a new application is installed in the mobile terminal 1.

In the following, we suppose that the user wants to assent a service promoted by his/her telecommunication service provider. Particularly, we assume that one new application (referred as application AP in the following of the description) is installed in the mobile terminal 1 in order to use all functionalities provided by the proposed service.

In this case, performing a new scanning of the File System in the mobile terminal 1, the application management module 103 detects such application AP and updates the corresponding second file F2. In more detail, the new application AP installed is indicated by incrementing the second counter and by listing its identification data, for example, the application identifier, its name, medium storing it, etc.

Then, the first F1 and the second F2 files are compared so that the application AP installed in the mobile terminal 1 can be detected.

Particularly, the changed list of applications stored in the second file F2 has to be transferred also to the SIM card 2.

Figure 7C:
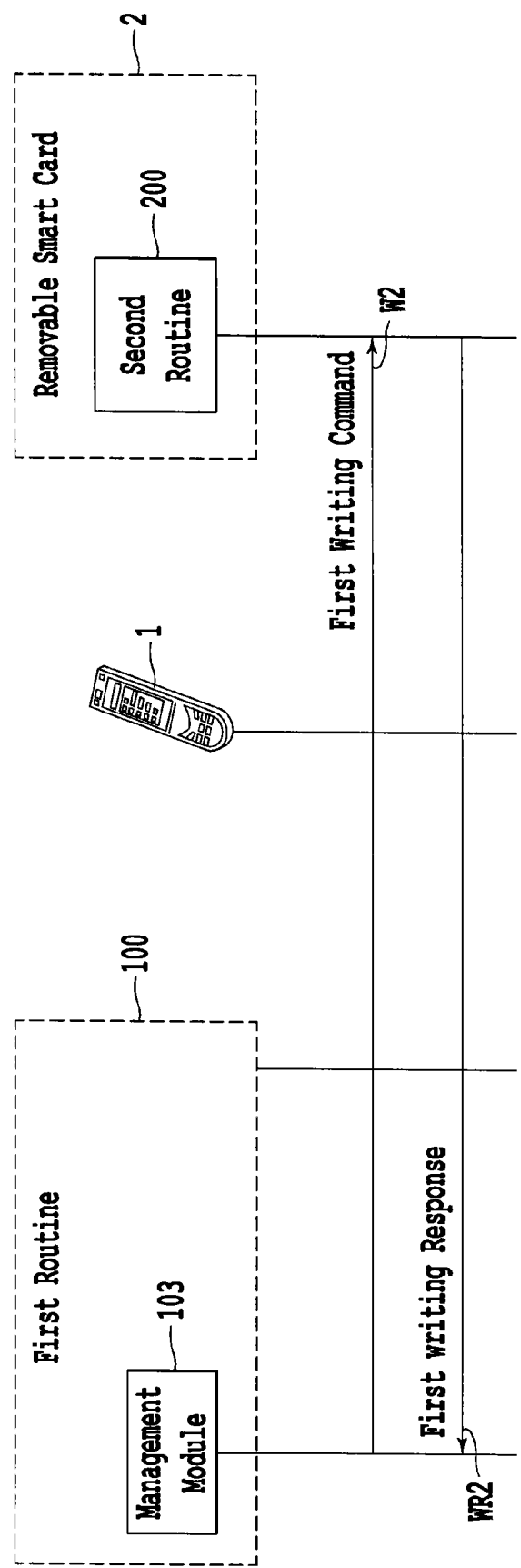

In a preferred embodiment, with reference to FIG. 7C, the management module 103 sends a first writing command W2 to the second routine 200 requesting to modify the list of applications contained in the third file F3. In more detail, identification data related to the new application comprised in the second file F2 are copied also in such third file F3. The second routine 200 responds to the first writing command W2 by a suitable first writing response WR2 indicating that the list of applications in the third file F3 has been correctly updated.

Then, the management module 103 modify the content of the first file F1 so that it contains the same identification data comprised in the third file F3.

After a wait period, the management module 103 performs a further scanning of the File System in the mobile terminal 1 searching for new applications installed therein. As no more applications have been installed, the second file F2 contains only the application AP previously installed. Therefore, by comparing the first F1 and second F2 files among them, no further operations are requested as the two files coincide.

By periodically repeating such scanning operation, the method remains unchanged until a further new application is installed in the mobile terminal 1 by the user.

If the user desires to change his/her mobile terminal 1, for example by replacing it with a new further mobile terminal 1a, the SIM card 2 previously located in the terminal 1 is inserted in such new further terminal 1a.

In this case, a preferred embodiment of the inventive method can be described with reference to FIGS. 8 and 9.

As indicated above, the SIM card 2 contains in the third file F3 identification data related to all applications previously stored in the old mobile terminal 1 and particularly, data related to the application AP. Moreover, it is assumed that such further mobile terminal 1a is provided by the respective first routine 100 which includes the application management module 103.

When the further mobile terminal 1a is switched on, the application management module 103 is activated by the further activation command 5. Moreover, the second routine 200 is also activated by the "Terminal Profile" command 4. Subsequently, the same management module 103 sends the information request 50 (Get Version) to the first routine 100 in order to know whether the second routine 200 is included in the SIM card 2. The second routine 200 replies giving a respective identification response 60 to confirm to be present in the SIM.

Subsequently, the first application routine (100), in particular the application management module 103 sends the first information request 55 to the second routine 200 requesting to read the list of applications (i.e. identification data of the applications) installed in the SIM card 2. Particularly, the SIM card 2 includes the third file F3 previously created, therefore the second routine 200 sends the first information response 65 including the list of applications stored in such third file F3.

The application management module 103 creates a further first file F1a on the further mobile terminal 1a for storing identification data comprised in the third file F3. Such further first file F1a is analogous to the first file F1 and, for example, can store: an identifier of the application, a name indicating the application, a memory location where it is stored, etc. In addition, the further first file F1a includes a respective counter for indicating the number of applications listed therein.

After that, the management module 103 performs a first scanning of the File System of the further mobile terminal 1a searching for applications installed therein. As the further mobile terminal 1a does not contains applications, the management module 103 creates a further second file F2a, located in the memory of the further mobile terminal 1a. Such further second file F2a includes a respective second counter for indicating the total number of applications stored in the further mobile terminal 1a. In this case such second counter=0.

By comparing the content of further first F1a and further second F2a files, the management module 103 is suitable to detect that the application AP was stored in the mobile terminal 1 which previously housed the SIM card 2. Now, such application AP is not included in the further mobile terminal 1a.

In order to recover the missing application AP, the application management module 103 activates a bidirectional communication (PDP Context) between the further mobile terminal 1a and the server 3. For example, such bidirectional communication is a data transmission according to one of GPRS, EDGE, UMTS, HSDPA communication standards.

Figure 9:
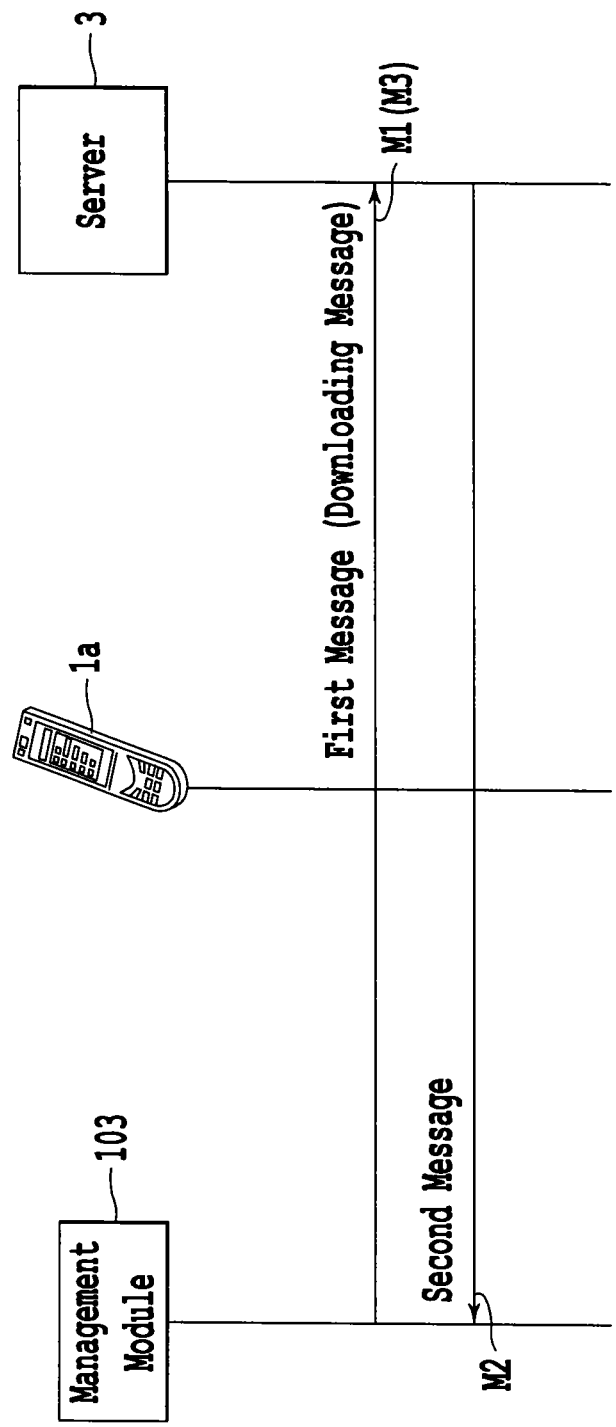

In more detail, with reference to FIG. 9, the management module 103 firstly reads in the third file F3 of the SIM card 2 the identifier (UID) corresponding to the missing application AP to be recovered.

Then, the management module 103, through the further mobile terminal 1a, sends a first message M1 to the server 3 to request the application AP. Particularly, such first message M1 is a binary message comprising in a first field the identifier of the requested application AP and in a second field the IMEI number of the new further terminal 1a which unambiguously identifies it.

Starting from the information contained in the first message M1, the server 3 searches in its own database the file containing data of the requested application AP. Particularly, the server 3 searches for the updated version of the application AP that has to be compatible with the further terminal 1a. For example, the file searched can be a .ZIP file.

Then, in a preferred embodiment, the server 3 replies to the request of the management module 103 by sending a second message M2 which includes the URL indicating the browser link which allows to a rapid download of the .ZIP file by internet.

In a further embodiment, the application management module 103 sends a downloading message M3 to the server 3 to directly download the .ZIP file above indicated. Preferably, such downloading message M3 is sent to a separated storing medium 3a (repository), not shown in FIG. 9, which is suitable to include the .ZIP files of the available application AP.

The server 3 (or the storing medium 3a) replies by providing the .ZIP file requested to the further mobile terminal 1a. Data related to the requested application are extracted by the management module 103 from such .ZIP file in order to install the recovered application AP in the further mobile terminal 1a.

Advantageously, starting from information and data listed in the third file F3, the method of the invention allows to automatically re-establish on the further mobile terminal 1a all applications that were present in the previous mobile terminal 1.

After a wait period, the management module 103 scans the File System of the further mobile terminal 1a searching for new applications installed therein. As the application AP has been installed, the further second file F2a is updated by including the identifier of such application AP, its corresponding name, where the same application is stored etc. Moreover, the second counter of the further second file F2a is incremented, i.e. second counter=1.

Therefore, by comparing the contents of the further first F1a and further second F2a files, no further operations are requested as the two files coincide.

Advantageously, the inventive method allows the multimedia applications that usually require a heavy memory occupation to be stored into the memory of the mobile terminal 1 or 1a which is greater than the corresponding memory of the SIM card 2.

Moreover, by providing the SIM card 2 with the second application routine 200 suitable to cooperate with the corresponding first routine 100 of the mobile terminal 1 or 1a, the same SIM card 2 has only to store the identification data of such applications in the third file F3. In addition, in accordance with the inventive method, the SIM card 2 is suitable to control the applications installed in the mobile, including activation, upgrading and downloading of the applications from the server 3. Particularly, the SIM card 2 can periodically verify if an application is present in the mobile terminal 1 in order to reactivate it as consequence of a terminal changing or after a deletion of the application itself.

In addition, advantageously, the multimedia applications for mobile terminals 1, 1*a* can be downloaded from a server 3 via GPRS/EDGE/UMTS/HSDPA. In this way, obtaining applications or services is made faster with respect a solution in which such application are recovered by OTA-SMS procedures.

Another advantage of the inventive method is that it works even if the communication between the mobile terminal 1 and the SIM card 2 employs a data bus with a reduced communication rate. For example, to load a 1 MByte application one should upload on the SIM 1000000 of Byte. By this invention, needed communication with the SIM will reduce to no more than 500 bytes, to store information identifying the application on the terminal. So you have a saving of 200000% on the bus. In fact, as the multimedia applications are stored in the mobile terminal 1 (or 1*a*), the number of byte that the same SIM card 2 has to provide to the terminal 1 is strongly reduced.

In addition, the method of the invention can be applied to SIM cards 2 having a reduced memory resources and employing standard interfaces, for example ISO7816-3. In this way, costs to acquire such cards are reduced for the service provider. At the same time, with such method the service provider is able to increase the number of mobile terminals including the multimedia applications by which the users can provide revenues when they use different services.

The invention claimed is:

1. A method for transferring an individual application module into a telecommunication terminal, comprising:
    storing in a removable smart card identification data related to said the individual application module;
    electrically connecting the removable smart card to the telecommunication terminal in order to establish a communication between the removable smart card and the telecommunication terminal;
    acquiring by the telecommunication terminal the identification data;
    sending by the telecommunication terminal the identification data to an application storing device for requesting the individual application module;
    downloading in the telecommunication terminal and from the application storing device the individual application module corresponding to the identification data,
    wherein the individual application module is capable of being stored within the telecommunication terminal,
    wherein the method further comprises:
    providing a first application routine memorized in the telecommunication terminal and a second application routine memorized in the removable smart card,
    wherein storing in a removable smart card further comprises generating by the first application routine a file in the removable smart card to store therein the identification data of the individual application module, and
    wherein generating the file in the removable smart card, further comprises:
    sending by the first application routine an activation command to the second routine requesting to create the file;
    sending by the second routine an activation response indicative that the requested file has been created;
    sending by the first application routine a writing command to the second routine comprising identification data of applications installed in the telecommunication terminal; and
    sending by the second application routine a writing response indicative that the identification data have been received.

2. The method according to claim 1, wherein the first application routine is capable of exchanging information with the second application routine by accessing to a common file in the removable smart card.

3. The method according to claim 2, further comprising, at switching on of the telecommunication terminal, following the electrically connecting the removable smart card and the telecommunication terminal:
    sending by the telecommunication terminal a first activation command to the second application routine to activate the second routine;
    sending by the telecommunication terminal a further activation command to the first application routine to activate the first routine;
    sending by the first application routine an identification command to the second application routine to verify that the second application routine is present in the removable smart card; and
    sending by the second application routine an identification response to the first application routine to confirm to be present.

4. The method according to claim 2, wherein acquiring the identification data further comprises:
    sending by the first application routine a first information request to the second application routine requesting to read identification data of the individual application module in the file;
    sending by the second application routine a first information response to the first application routine comprising the identification data of the individual application module stored in the file;
    generating by the first application routine a first file memorized in the telecommunication terminal for storing the identification data in the file;
    generating by the first application routine a second file memorized in the telecommunication terminal for storing identification data of further applications stored in the telecommunication terminal; and
    comparing by the first application routine the first and second file to detect whether a requested individual application module is stored in the telecommunication terminal.

5. The method according to claim 4, wherein sending by the telecommunication terminal the identification data to an application storing device, further comprises:
    sending by the first application routine a first message to the application storing device to request the individual application module, the first message being a binary message comprising both identification data of the requested individual application module and an identification number of the telecommunication terminal; and
    searching by the application storing device in a database thereof, data of the requested individual application module that are compatible with the telecommunication terminal.

6. The method according to claim 1, wherein downloading in the telecommunication terminal comprises sending by the application storing device a second message comprising a browser link which allows a rapid download of the individual application module by internet.

7. The method according to claim 1, wherein sending by the telecommunication terminal the identification data to an application storing device, further comprises sending a downloading message to the application storing device to directly download the individual application module.

8. The method according to claim 7, wherein the downloading message is sent to a storing medium separated from the application storing device.

9. The method according to claim 7, wherein sending by the telecommunication terminal the identification data to an application storing device, and downloading in the telecommunication terminal and from the application storing device, are data transmission performed according to one of the following communication standards: General Packet Radio Service, Enhanced Data Rates for Global System for Mobile Communications Evaluation, Universal Mobile Telecommunications System, and High-Speed Downlink Packet Access.

10. The method according to claim 2, wherein the first application routine comprises a plurality of software modules or an application management module capable of monitoring applications installed in the telecommunication terminal.

11. The method according to claim 2,
wherein at switching-on of the telecommunication terminal, if the first and second application routines are in the telecommunication terminal and in the removable smart card, further comprising an initialization phase, comprising:
sending by the telecommunication terminal a first activation command to the second application routine to activate the second application routine;
sending by the same telecommunication terminal a further activation command to the first application routine to activate the first application routine;
accessing by the first application routine a common file in the removable smart card to read a record thereof;
overwriting by the first application routine a message contained in the record by replacing thereof with a request message addressed to the removable smart card;
generating by the common file an update signal and sending thereof to the second application routine to indicate that a new message is present in the record;
reading by the second application routine the modified record to verify that the message therein has been really generated by the first application routine;
creating by the second application routine a response message to be written in the same record of the common file; and
reading by the first application routine the response message created by periodically accessing to the common file.

12. The method according to claim 11, wherein, if the second application routine is in the removable smart card but the first application routine is missing in the telecommunication terminal, further comprising:
generating by the telecommunication terminal a plurality of status messages to be sent to the second application routine;
counting by the second application routine the number of status messages received;
evaluating by the second application routine that the first application routine is missing in the telecommunication terminal if no request message has been received before the third status message;
providing by the second application routine a request to the application storing device for requesting the missing first application routine; and
providing by the application storing device a requested first application routine to the telecommunication terminal, the requested first application routine being subsequently installed in the terminal.

13. The method according to claim 12, wherein providing a request further comprises:
sending by the second application routine a respective request message to the telecommunication terminal to know an international mobile equipment identity number which identifies the telecommunication terminal; and
writing by the second application routine the international mobile equipment identity number in a short message to be sent to the application storing device.

14. The method according to claim 12, wherein providing the requested first application routine, further comprises:
generating by the application storing device a further message which comprises a uniform resource locator or a browser link for allowing a rapid download of the first application routine by internet.

15. The method according to claim 14, wherein the further message comprises a multimedia messaging service capable of storing a whole first application routine to be sent to the telecommunication terminal.

16. The method according to claim 11, wherein a 30th record of the common file is accessed.

17. The method according to claim 16, further comprising storing in a memory of the telecommunication terminal a short message service message in the 30th record before overwriting thereof.

18. The method according to claim 2, wherein the first application routine comprises:
a first computer program module acting as a communication interface between a plurality of service computer program modules in a same first application routine and the second application routine; and
a second computer program module acting as a process manager to perform in background a multiplicity of operations.

19. The method according to claim 18, wherein the plurality of service computer program modules comprises:
a management module capable of monitoring applications installed in the telecommunication terminal and of comparing the individual application module with a list of applications stored in a corresponding removable smart card;
a multimedia module to realize encoding/decoding reserved data, memorizing the data in protected memory locations;
a storage module capable of transferring all short message services received by the telecommunication terminal into a corresponding removable smart card;
a phone book module operating for saving telephone contacts memorized in the telecommunication terminal in a corresponding phone book of the removable smart card; and
a further module which allows sending a short message service generated by a link to a web site.

20. The method according to claim 2, wherein the second application routine comprises:
a further first computer program module acting as a communication interface with the first routine;
a protocol data unit for applications managing module capable of alerting a corresponding core module when one protocol data unit for applications sent by the telecommunication terminal has been received, the core module acting to interpret information and messages received and to coordinate actions performed by all other modules of the second application routine;

a resource managing module capable of creating files located in the memory of the removable smart card wherein the information received by the same smart card can be stored;

a further communication module which is capable of receiving short message service over the air sent by a service provider to the removable smart card in order to activate a new service or to update an existing one, the module also allowing receipt of configuration and security messages;

a security module to interface both the core module and the resource managing module to allow the core module and the resource managing module to secure access to a message or information, or to secure access to a message or information when the same are encoded or protected with a digital signature; and a support module to communicate with the first application routine.

21. The method according to claim 1, wherein the removable smart card is a subscriber identity module card.

22. The method according to claim 11, wherein the initialization phase is performed automatically when the telecommunication terminal is started up.

23. The method according to claim 1, wherein the individual application module is capable of being completely stored within the telecommunication terminal.

* * * * *